April 29, 1952  F. E. EDWARDS, JR  2,595,190
CLUTCH AND BRAKE FOR A SERVO MECHANISM
Filed June 23, 1948
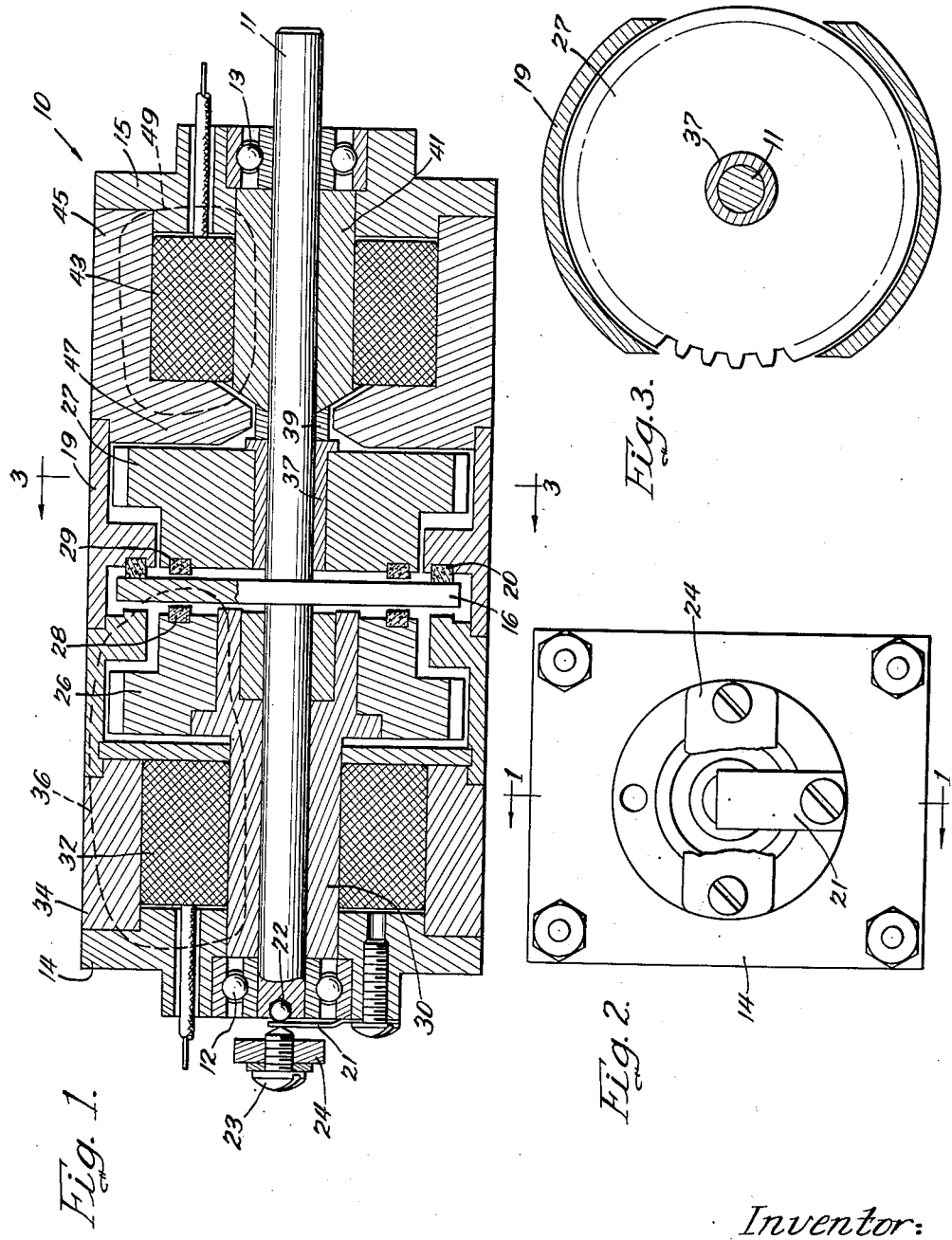
Inventor:
Francis E. Edwards Jr.,
By Armand A. Cyr
Atty.

Patented Apr. 29, 1952

2,595,190

UNITED STATES PATENT OFFICE 2,595,190

CLUTCH AND BRAKE FOR A SERVO MECHANISM

Francis E. Edwards, Jr., Chicago, Ill., assignor to Buehler and Company, a corporation of Illinois Application June 23, 1948, Serial No. 34,700

6 Claims. (Cl. 192—18)

1

This invention relates generally to servo mechanism, and it has particular relation to miniature servo mechanism.

Among the objects of this invention are: to provide for driving a disc fast on a shaft in one direction or the other by moving relatively one or the other of two oppositely driven gears on opposite sides of said disc into driving engagement therewith; to move the disc relative to the gears selectively by a solenoid individual to each; to hold the disc stationary when neither solenoid is energized and to release the same upon energization of either solenoid; to provide a magnetic circuit which includes the disc for energization by one solenoid to attract the disc into driving engagement with one of the gears; and to operatively connect an armature energizable by the other solenoid with the other gear for moving it into driving engagement with the disc.

With the foregoing objects outlined and with other objects in view which will appear as the description proceeds, the invention consists in the novel features hereinafter described in detail, illustrated in the accompanying drawing, and more particularly pointed out in the appended claims.

In the drawing:

Fig. 1 is a longitudinal sectional view taken along the line 1—1 of Fig. 2, showing the internal details of construction of a servo mechanism in which this invention is incorporated;

Fig. 2 is a view in end elevation of Fig. 1;

Fig. 3 is a detail sectional view taken along the line 3—3 of Fig. 1.

Referring to the drawing in detail, it will be observed that the reference character 10 represents generally a servo mechanism which can be employed for the usual purposes for which such devices are employed. They include control, positioning, setting and regulating functions and the like. The servo mechanism 10 includes an output shaft 11 which, it will be understood, can be connected to the device or mechanism that is to be driven. The shaft 11 is journaled in ball bearings 12 and 13 which are mounted in end plates 14 and 15 of magnetic material.

Intermediate the end plates 14 and 15 is a clutch disc 16 that is fast on the shaft 11. It will be understood that the clutch disc 16 and shaft 11 have a limited endwise movement relative to the bearings 12 and 13 for a purpose which will be set forth hereinafter. Surrounding the clutch disc 16 is a sleeve 19 of non-magnetic material such as brass. The sleeve 19 carries a brake ring 20 which is arranged to engage frictionally the clutch disc 16. A leaf spring 21, suitably

2 mounted on the end plate 14 bears against a ball 22 for urging the shaft 11 to the right, as viewed in Fig. 1, and thereby the clutch disc 16 into engagement with the brake ring 20. The tension of the spring 21 may be varied by bending it to the necessary shape, or by any suitable means such as a screw, not shown. An adjusting screw 23 that is threaded in a bracket 24 which, as shown in Fig. 2, is carried by the end plate 14, serves to limit longitudinal motion of the shaft 11 toward the left.

In order to drive the clutch disc 16 in one direction or the other to effect a corresponding rotation of the shaft 11, gears 26 and 27 are located on opposite sides of it and are rotatably mounted with respect to the shaft 11. Suitable means, not shown, may be provided for driving the gears 26 and 27 in opposite directions. Gear 26 is formed of non-conductive, non-magnetic material such as a suitable plastic, while gear 27 may or may not be formed of such material, as desired. The faces of the gears 26 and 27 adjacent the clutch disc 16 are provided with clutch rings 28 and 29 respectively. When relative movement of the disc 16 takes place endwise with respect to the clutch rings 28 and 29, it will be understood that the disc 16 and shaft 11 are rotated in one direction or the other, depending upon the direction of relative movement.

The gear 26 on the left hand side of the clutch disc 16 is rigidly mounted on a hollow core 30 of magnetic material through which the shaft 11 extends. In order to move the disc 16 away from the brake 20, and to move the gear 26 with its clutch ring 28, into driving engagement with the disc 16, a solenoid 32 is provided and, as shown in Fig. 1, it is loosely positioned around the core 30. Surrounding the solenoid 32, and rigidly supporting it, is a sleeve 34 of magnetic material which provides a path for the magnetic flux that is indicated by broken line 36. It will be noted that the magnetic circuit which is energized on energization of the solenoid 32 includes as a part the clutch disc 16. Thus, when the solenoid 32 is suitably energized, magnetic flux generated thereby flows along the path 36 and the disc 16 is moved away from the brake 20 against the biasing force of the leaf spring 21, and simultaneously the gear 26 with its clutch ring 28 is moved to the right (Fig. 1) into driving engagement with the disc 16. It will be understood that this axial movement of the disc 16 and gear 26 is slight, but is enough to move the disc out of engagement with the brake ring 20 and the clutch ring 28 into driving engagement with the disc 16. As long as the solenoid 32 remains energized, the disc 16 and the shaft 11 are rotated in the direction that the gear 26 rotates.

It should be noted that when the solenoid 32 is energized, the gear 26 with its clutch ring 28 will tend to move into contact with the disc 16 before the disc 16 moves away from the brake ring 20, because movement of the disc 16 to the left (Fig. 1) is opposed by the spring 21. This sequence is particularly advantageous because it assures that the desired driving force is applied to the disc 16 before the brake is released, and, in this respect, the action is similar to the right-hand side of the unit, as hereinafter described.

In order to rotate the disc 16 in the opposite direction, the gear 27 is moved axially of the shaft 11 so that the clutch ring 29 carried thereby is placed in driving engagement with the disc 16. This movement takes place against the biasing force of the leaf spring 21 and is sufficient to move the disc 16 out of engagement with the brake ring 20.

In order to move the gear 27 in the manner just described, it is arranged to be moved with a sleeve 37 that is engaged by a collar 39 which can be urged to the left by a hollow armature 41 on energization of a solenoid 43 positioned therearound. The magnetic circuit around the solenoid 43 is completed through a sleeve 45 of magnetic material which has an integrally inwardly radially extending flange 47. The path of the magnetic flux generated by the solenoid 43 is indicated by the broken line 49.

It will be understood that a suitable control is provided for energizing either the solenoid 32 or the solenoid 43 in accordance with the function which it is desired to have performed, or the varying characteristic of a quantity which is to be controlled by the servo mechanism 10. Since any suitable and well known control can be employed for selectively energizing the solenoids 32 and 43, a description thereof is not set forth herein.

While I have described and illustrated a preferred embodiment of my invention in such manner that the same may be readily understood by those skilled in the art, I am aware that changes may be made in the details disclosed without departing from the spirit of the invention as expressed in the following claims.

What I claim and desire to secure by Letters Patent is:

1. In a servo mechanism, in combination, a rotatable shaft, a clutch disc of magnetic material fast on said shaft, a pair of gears rotatably mounted about said shaft on opposite sides of said disc and arranged to be driven in opposite directions, clutch rings secured to said gears and arranged to frictionally engage opposite faces of said clutch disc, a magnetic circuit including said clutch disc as a part thereof, the gear on the side of said clutch disc next to said magnetic circuit being formed of non-magnetic material, a solenoid for energizing said magnetic circuit to cause one face of said disc to be placed in driving engagement with the clutch ring carried by said gear of non-magnetic material to rotate said shaft in one direction, an armature operatively connected to the other of said gears, and a solenoid for energizing said armature to move the clutch ring carried by said other gear into driving engagement with the opposite face of said disc to rotate said shaft in the opposite direction.

2. The invention as defined in claim 1, wherein a brake ring is stationarily mounted on the side of the disc away from the magnetic circuit, and a spring biases said disc into engagement with said brake ring for holding said disc stationary, said disc being moved out of engagement with said brake ring against the biasing force of said spring on energization of either of the solenoids.

3. In a servo mechanism, in combination, a rotatable shaft, a clutch disc of magnetic material fast on said shaft, a pair of gears rotatably mounted about said shaft on opposite sides of said disc, said gears being arranged to be driven in opposite directions and movable toward and away from corresponding sides of said disc for driving it in one direction or the other, a magnetic circuit including said clutch disc as a part thereof, the gear on the side of said clutch disc next to said magnetic circuit being formed of non-magnetic material, a solenoid for energizing said magnetic circuit to cause said disc to be placed in driving engagement with said gear of non-magnetic material, an armature operatively connected to the other of said gears, and a solenoid for energizing said armature to move said other gear into driving engagement with said disc.

4. The invention as defined in claim 3, wherein brake means is stationarily mounted on the side of the disc away from the magnetic circuit, and a spring biases said disc into engagement with said brake means for holding said disc stationary, said disc being moved out of engagement with said brake means against the biasing force of said spring on energization of either of the solenoids.

5. In a servo mechanism, in combination, a frame, a rotatable shaft mounted in the frame, a clutch disc of magnetic material on said shaft, a driving gear rotatably mounted about said shaft on one side of said disc and having limited longitudinal movement relative thereto, a magnetic circuit including said clutch disc as a part thereof, a solenoid for energizing said magnetic circuit to cause said disc to be placed in driving engagement with said gear, a brake mounted on the side of the disc away from the magnetic circuit, and resilient means biasing the disc into engagement with said brake for holding the disc stationary, said magnetic circuit including at least two air gaps, one between said gear and said disc, and the other between said disc and a part of said frame, the resilient biasing means cooperating with the solenoid to maintain the disc in engagement with the brake after energization of said solenoid, and while the gear moves into engagement with the disc in closing said first air gap and then yielding in response to continued energization of the solenoid to close said second air gap and move the disc and driving gear away from said brake, whereby said disc is maintained in constant engagement with said brake until the driving gear is brought into engagement with the disc.

6. In a servo mechanism, a frame, a rotatable shaft journalled in the frame and having longitudinal movement relative thereto, a clutch disc of magnetic material made fast on the shaft at a point intermediate its ends, first gear means rotatably mounted on the shaft and adapted to be driven in a given direction, said first gear means having limited longitudinal movement relative to the shaft in a direction parallel thereto and having a friction clutch surface adjacent to one face of said clutch disc, a friction brake fixed to the frame adapted to contact the other side of the clutch disc to hold it against rotation, resilient means urging the shaft in a direction to apply the brake to the clutch disc, first electromagnetic means for substantially simultaneously moving said first gear means with its clutch surface into engagement with the clutch disc and the clutch disc away from the brake, said first electromagnetic means including a solenoid fixed to the frame and an iron circuit, a portion of which is associated with the first gear means and a portion with the frame, second gear means rotatably mounted on the shaft on said other side of the clutch disc and rotatable in a direction opposite from that of the first gear means, said second gear means having limited longitudinal movement relative to the shaft in a direction parallel thereto and having a friction clutch surface adjacent to said other face of said clutch disc, and second electromagnetic means for substantially simultaneously moving said second gear means with its clutch surface into engagement with the clutch disc and the clutch disc away from the brake.

FRANCIS E. EDWARDS, Jr.

REFERENCES CITED

The following references are of record in the file of this patent:

UNITED STATES PATENTS

| Number | Name | Date |
| --- | --- | --- |
| 2,272,570 | Maier | Feb. 10, 1942 |
| 2,315,298 | Thompson | Mar. 30, 1943 |
| 2,438,223 | Lear | Mar. 23, 1948 |